United States Patent
Terzis

(10) Patent No.: US 10,525,907 B2
(45) Date of Patent: Jan. 7, 2020

(54) CABLE CLAMP FOR A CHARGING CABLE OF AN ELECTRIC VEHICLE CHARGING STATION

(71) Applicant: ChargePoint, Inc., Campbell, CA (US)

(72) Inventor: Price B. Terzis, Los Altos Hills, CA (US)

(73) Assignee: CHARGEPOINT, INC., Campbell, CA (US)

(*) Notice: Subject to any disclaimer, the term of this patent is extended or adjusted under 35 U.S.C. 154(b) by 4 days.

(21) Appl. No.: 15/861,649

(22) Filed: Jan. 3, 2018

(65) Prior Publication Data

US 2018/0186315 A1   Jul. 5, 2018

Related U.S. Application Data

(60) Provisional application No. 62/442,413, filed on Jan. 4, 2017.

(51) Int. Cl.
*B60R 16/02* (2006.01)
*B60L 11/18* (2006.01)
(Continued)

(52) U.S. Cl.
CPC ...... *B60R 16/0215* (2013.01); *F16L 19/0656* (2013.01); *H01R 13/58* (2013.01); *H01R 13/6392* (2013.01); *H02G 3/22* (2013.01)

(58) Field of Classification Search
CPC ............. B60R 16/0215; B60R 16/0207; B60L 11/1818; B60L 11/1825; B60L 2230/12; H01R 13/6392; H01R 13/58; H01R 13/6395; H01R 13/639; H02G 3/22; H02G 3/24; H02G 3/26; H02G 3/30; H02G 3/32;
(Continued)

(56) References Cited

U.S. PATENT DOCUMENTS 3,809,798 A * 5/1974 Simon .................. H02G 3/0633
174/135
5,405,172 A   4/1995 Mullen, Jr.
(Continued)

FOREIGN PATENT DOCUMENTS

| JP | 2014110655 A | 6/2014 |
| KR | 20130068729 A | 6/2013 |
| WO | 2016020512 A1 | 2/2016 |

OTHER PUBLICATIONS

International Search Report and Written Opinion for Application No. PCT/US2018/012337, dated Apr. 26, 2018, 12 pages.

*Primary Examiner* — Angel R Estrada
(74) *Attorney, Agent, or Firm* — Nicholson De Vos Webster & Elliott LLP

(57) ABSTRACT

A cable clamp for a charging cable of an electric vehicle charging station. The cable clamp includes a first clamping piece and a second clamping piece that is complementary to the first clamping piece. The first clamping piece and the second clamping piece are adapted to be secured together and adapted to grip the charging cable of the electric vehicle charging station that passes through the first clamping piece and the second clamping piece. The shape of the first clamping piece and the second clamping piece includes a curved portion that forces the charging cable of the electric vehicle charging station to exit the electric vehicle charging station at a predetermined exit angle.

20 Claims, 7 Drawing Sheets

(51) Int. Cl.
*F16L 19/065* (2006.01)
*H01R 13/639* (2006.01)
*H01R 13/58* (2006.01)
*H02G 3/22* (2006.01)

(58) Field of Classification Search
CPC ......... H02G 3/36; F16L 19/0656; H01B 7/10; H01B 9/00
USPC ... 174/151, 480, 481, 68.3, 72 R, 68.1, 488, 174/490, 72 A; 220/3.2, 3.3; 248/68.1, 248/49; 138/157, 109, 155; 285/179
See application file for complete search history.

(56) References Cited

U.S. PATENT DOCUMENTS

| | | | | |
|---|---|---|---|---|
| 5,621,191 | A | 4/1997 | Norris et al. | |
| 6,462,276 | B2 * | 10/2002 | Shimizu | H02G 3/26 174/659 |
| 6,878,879 | B2 * | 4/2005 | Takahashi | H02G 3/0608 174/68.3 |
| 7,964,796 | B2 * | 6/2011 | Suzuki | B60R 16/0215 174/72 A |
| 7,973,250 | B2 * | 7/2011 | Groeller | H02G 3/22 174/480 |
| 8,410,369 | B2 | 4/2013 | Kim et al. | |
| 9,434,269 | B2 | 9/2016 | Kim et al. | |
| 2011/0269332 | A1 | 11/2011 | Kim et al. | |

* cited by examiner

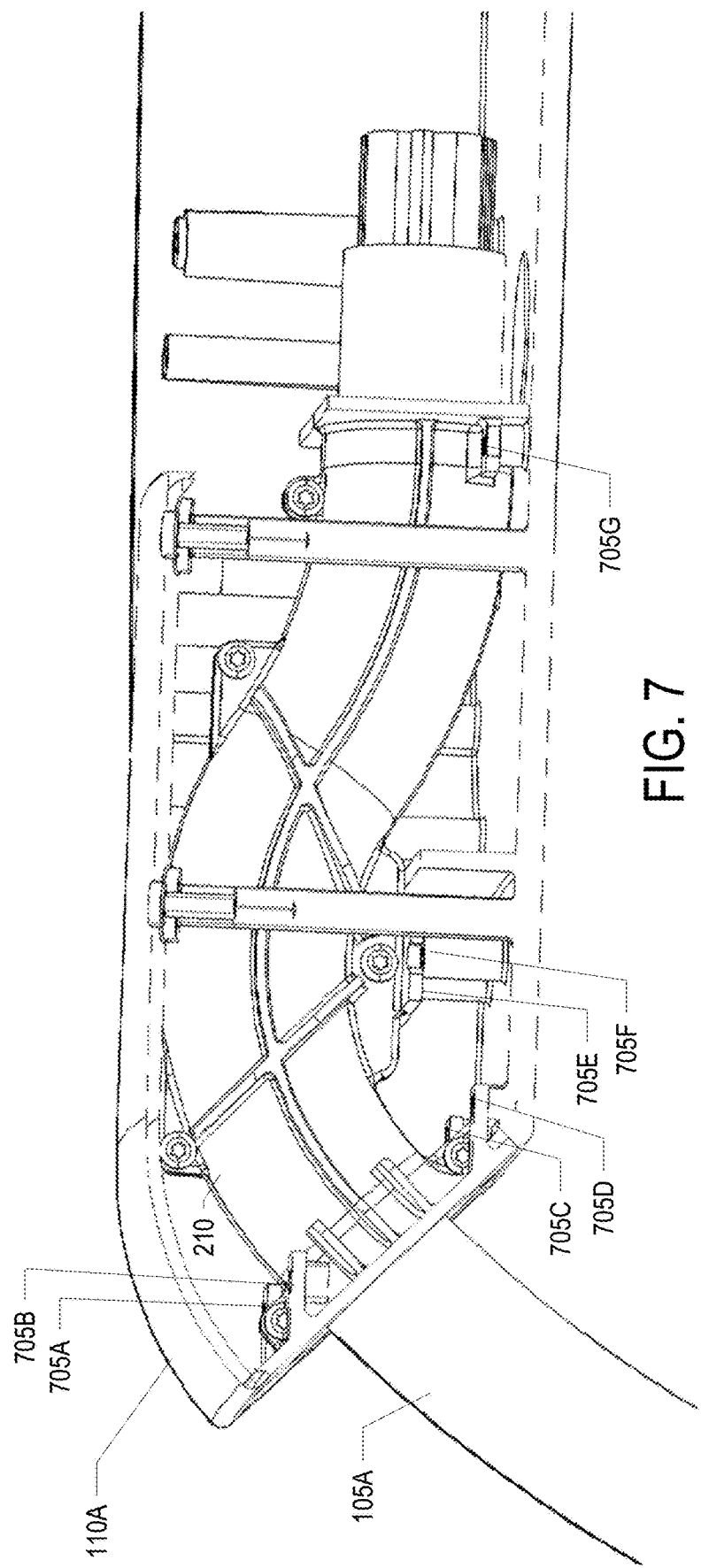

CABLE CLAMP FOR A CHARGING CABLE OF AN ELECTRIC VEHICLE CHARGING STATION

CROSS-REFERENCE TO RELATED APPLICATIONS

This application claims the benefit of U.S. Provisional Application No. 62/442,413, filed Jan. 4, 2017, which is hereby incorporated by reference.

FIELD

Embodiments of the invention relate to the field of electric vehicle charging; and more specifically to a cable clamp for a charging cable of an electric vehicle charging station.

BACKGROUND

Electric vehicle charging stations charge electric vehicles (e.g., electric battery powered vehicles, gasoline/electric battery powered hybrid vehicles, etc.). Energy is provided through a charging cable where one end is connected at the charging station and the other end connects to on-board charging circuitry of an electric vehicle. The charging cable and/or connectors (at the connection point at the charging station and/or at the electric vehicle) are subject to damage in case of unexpected vehicle runaway or other high force that is applied to the charging cable.

SUMMARY

A cable clamp for a charging cable of an electric vehicle charging station is described. In an embodiment, the cable clamp is a split clamp that includes multiple parts that are adapted to fit around a portion of the charging cable and be secured together. The multiple parts of the cable clamp are designed out of a rigid material, such as a rigid plastic. The cable clamp is secured to housing of the charging station. The cable clamp is located at an exit point of the housing of the charging station. The charging cable includes a set of charging wires that connect to a set of connectors in the charging station, which are inaccessible by users of the charging station (e.g., vehicle operators that charge their electric vehicles). The charging cable may be a liquid cooled cable where liquid (e.g., propylene glycol, water, or other coolant) flows through the cable (such as through a flexible tube within the cable) that cools the cable (including the set of charging wires) during use. The pieces of the cable clamp are secured together with one or more fasteners that prevent the charging cable from being impinged due to any over-tightening of the fastener(s). Cable jacket grip is achieved by grip length with bends to increase frictional forces. Grip length may be approximately six times the cable diameter, with inverted bend radii at the minimum bend radius.

In an embodiment, a cable clamp for a charging cable of an electric vehicle charging station, includes: a first clamping piece; and a second clamping piece that is complementary to the first clamping piece; where the first clamping piece and the second clamping piece are adapted to be secured together and adapted to grip the charging cable of the electric vehicle charging station that passes through the first clamping piece and the second clamping piece; and where a shape of the first clamping piece and the second clamping piece includes a curved portion that forces the charging cable of the electric vehicle charging station to exit the electric vehicle charging station at a predetermined exit angle.

Implementations of the cable clamp may include one or more of the following features in any combination. The cable clamp where the first clamping piece and the second clamping piece includes a plurality of internal ribs. The cable clamp where the predetermined exit angle is at a minimum bend radius of the charging cable. The cable clamp where a length of the first clamping piece and the second clamping piece is approximately six times a diameter of the charging cable. The cable clamp where the predetermined exit angle is between 30 and 60 degrees. The cable clamp where the first clamping piece and the second clamping piece are to be secured together with one or more fasteners and prevent the charging cable from being impinged. The cable clamp where the charging cable is a liquid cooled cable. The cable clamp where the first clamping piece and the second clamping piece are designed out of a rigid plastic material. The cable clamp where the first clamping piece and the second clamping piece are to be secured to a housing of the electric vehicle charging station with or more fasteners. The cable clamp where the cable clamp is to be located at an exit point of the housing of the electric vehicle charging station.

In an embodiment, an electric vehicle charging station, includes: a housing; a first clamping piece; and a second clamping piece that is complementary to the first clamping piece; where the first clamping piece and the second clamping piece are adapted to be secured together and adapted to grip a charging cable of the electric vehicle charging station that passes through the first clamping piece and the second clamping piece; and where a shape of the first clamping piece and the second clamping piece includes a curved portion that forces the charging cable of the electric vehicle charging station.

Implementations of the electric vehicle charging station may include one or more of the following features in any combination. The electric vehicle charging station where the first clamping piece and the second clamping piece includes a plurality of internal ribs. The electric vehicle charging station where the predetermined exit angle is at a minimum bend radius of the charging cable. The electric vehicle charging station where a length of the first clamping piece and the second clamping piece is approximately six times a diameter of the charging cable. The electric vehicle charging station where the predetermined exit angle is between 30 and 60 degrees. The electric vehicle charging station where the first clamping piece and the second clamping piece are to be secured together with one or more fasteners and prevent the charging cable from being impinged. The electric vehicle charging station where the charging cable is a liquid cooled cable. The electric vehicle charging station where the first clamping piece and the second clamping piece are designed out of a rigid plastic material. The electric vehicle charging station where the first clamping piece and the second clamping piece are to be secured to the housing of the electric vehicle charging station with or more fasteners. The electric vehicle charging station where the first clamping piece and the second clamping piece are to be secured to the housing at an exit point of the housing of the electric vehicle charging station.

BRIEF DESCRIPTION OF THE DRAWINGS

The invention may best be understood by referring to the following description and accompanying drawings that are used to illustrate embodiments of the invention. In the drawings:

FIG. 7 illustrates the cable clamp being secured to the charging station housing, according to an embodiment.

DESCRIPTION OF EMBODIMENTS

Figure 1:
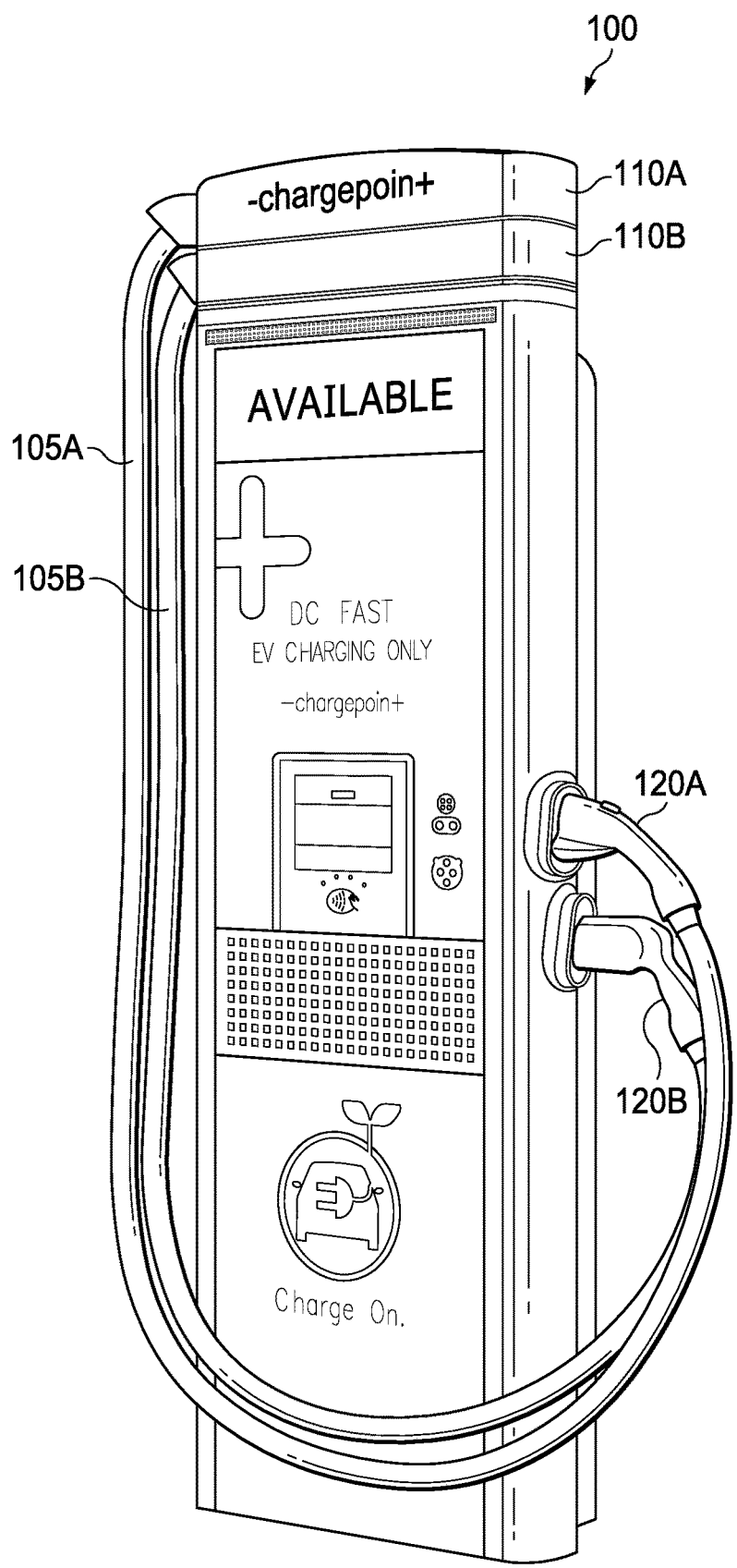
FIG. 1 illustrates an exemplary electric vehicle charging station that uses the cable clamp according to an embodiment.

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled" along with its derivatives, may be used. "Coupled" is used to indicate that two or more elements, which may or may not be in direct physical or electrical contact with each other, co-operate or interact with each other.

An apparatus for a cable clamp for a charging cable of an electric vehicle charging station (hereinafter "charging station") is described. In an embodiment, the cable clamp is a split clamp that includes multiple parts that are adapted to fit around a portion of the charging cable and be secured together. The multiple parts of the cable clamp are designed out of a rigid material, such as a rigid plastic. The cable clamp is secured to housing of the charging station. The cable clamp is located at an exit point of the housing of the charging station. The charging cable includes a set of charging wires that connect to a set of connectors in the charging station, which are inaccessible by users of the charging station (e.g., vehicle operators that charge their electric vehicles). The charging cable may be a liquid cooled cable where liquid (e.g., propylene glycol, water, or other coolant) flows through the cable (such as through a flexible tube within the cable) that cools the cable (including the set of charging wires) during use. The pieces of the cable clamp are secured together with one or more fasteners that prevent the charging cable from being impinged due to any over-tightening of the fastener(s).

Cable jacket grip is achieved by grip length with bends to increase frictional forces. The shape of the cable clamp includes a curved portion that forces the charging cable to exit the charging station at a predetermined exit angle. The predetermined exit angle may be at a minimum bend radius of the charging cable, and may be between 30 and 60 degrees. Grip length is approximately six times the cable diameter, with inverted bend radii at the minimum bend radius. Additional cable jacket grip may be achieved by adding internal ribs to periodically imprint the surface of the cable jacket. The number and size (internal diameter) of the internal ribs can be varied to achieve the desired cable tensile grip. By way of example, the internal ribs may protrude one to two millimeters from the inside of the cable clamp. The internal ribs may be angled.

FIG. 1 illustrates an exemplary electric vehicle charging station that uses the cable clamp according to an embodiment. The charging station 100 is used to charge electric vehicles (e.g., electric battery powered vehicles, gasoline/electric battery powered hybrid vehicles, etc.). The charging station 100 includes two charging cables 105A-B that may be each used to charge an electric vehicle. For example, an operator of an electric vehicle may connect the electric vehicle connector 120A connected with the charging cable 105A to on-board charging circuitry of their electric vehicle, or the electric vehicle connector 120B connected with the charging cable 105B, to transfer energy to the electricity storage device of the electric vehicle. Although the charging station 100 shows two charging cables, and each charging cable is secured with a cable clamp as described herein, it should be understood that embodiments may include a charging station with fewer, or more, charging cables. Each of the charging cables 105A-B may be a liquid cooled charging cable or a charging cable that is not liquid cooled.

Figure 2:
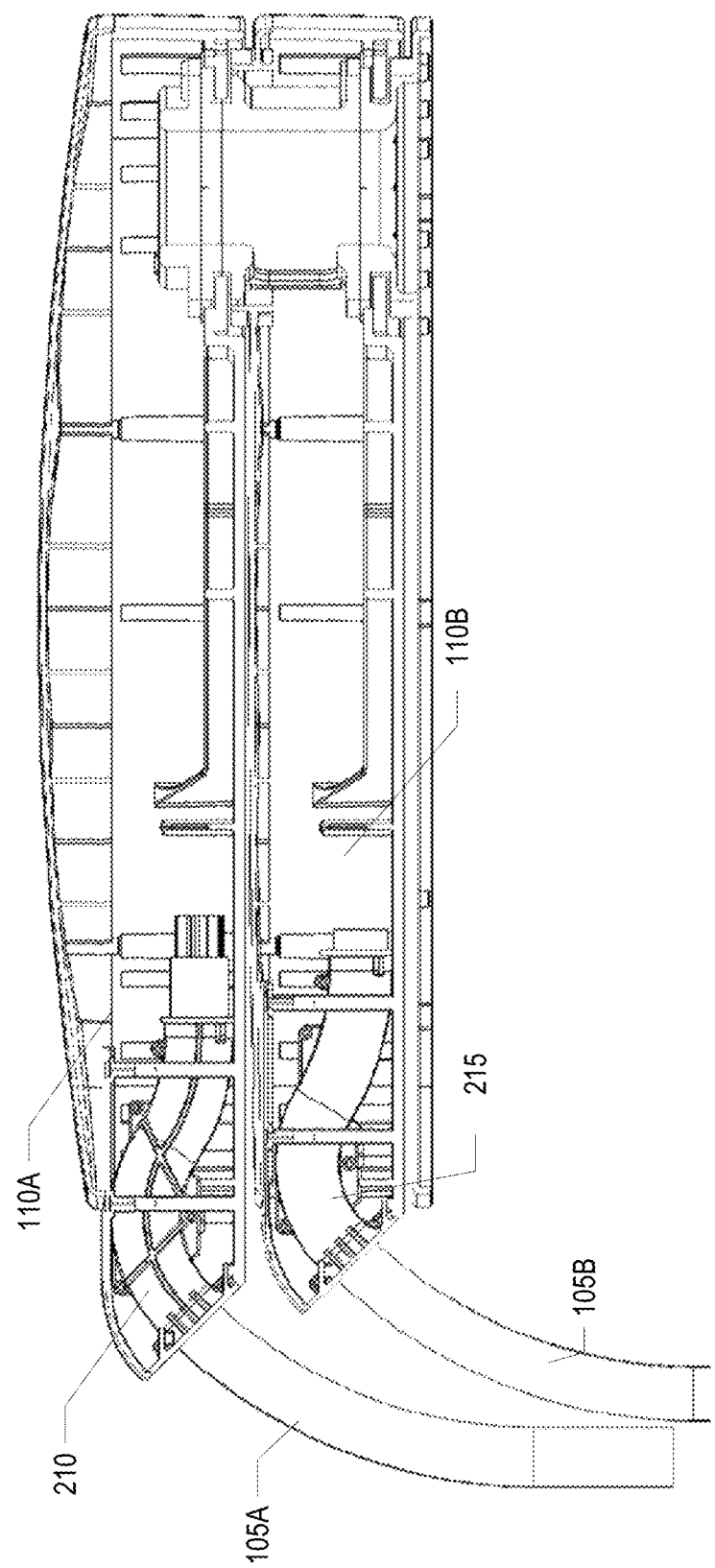
FIG. 2 shows the top part of the charging station of FIG. 1 that includes the cable clamp housing where the front face of the charging station is not visible to show the cable clamps, according to an embodiment.

The charging station 100 includes the charging station housing 110A that includes the cable clamp 210 and the charging station housing 110B that includes the cable clamp 215, as shown in FIG. 2. FIG. 2 shows the top part of the charging station 100 that includes the cable clamp housing where the front face of the charging station is not visible thereby showing the cable clamps 215 and 220. The cable clamp 210 is secured to the housing 110A and the cable clamp 215 is secured to the housing 110B. Each cable clamp 210 and 215 is located at an exit point of the housing the charging station. The charging cables 105A-B each include wires that provide connections to one or more components (not illustrated) (e.g., power, control pilot circuitry, GFCI (ground fault circuit interrupter), etc.) that allow the charging station 100 to transfer energy to electric vehicles. Although the cable clamps 215 and 220 are shown as being located at an exit point of the housing of the charging station, it should be understood that the cable clamps may be located elsewhere in the housing of the charging station. It should be understood that the charging station 100 includes other components that are not directly coupled with the charging clamps 210 and 215 and are not illustrated in order not to obscure understanding of the invention.

Figure 3:
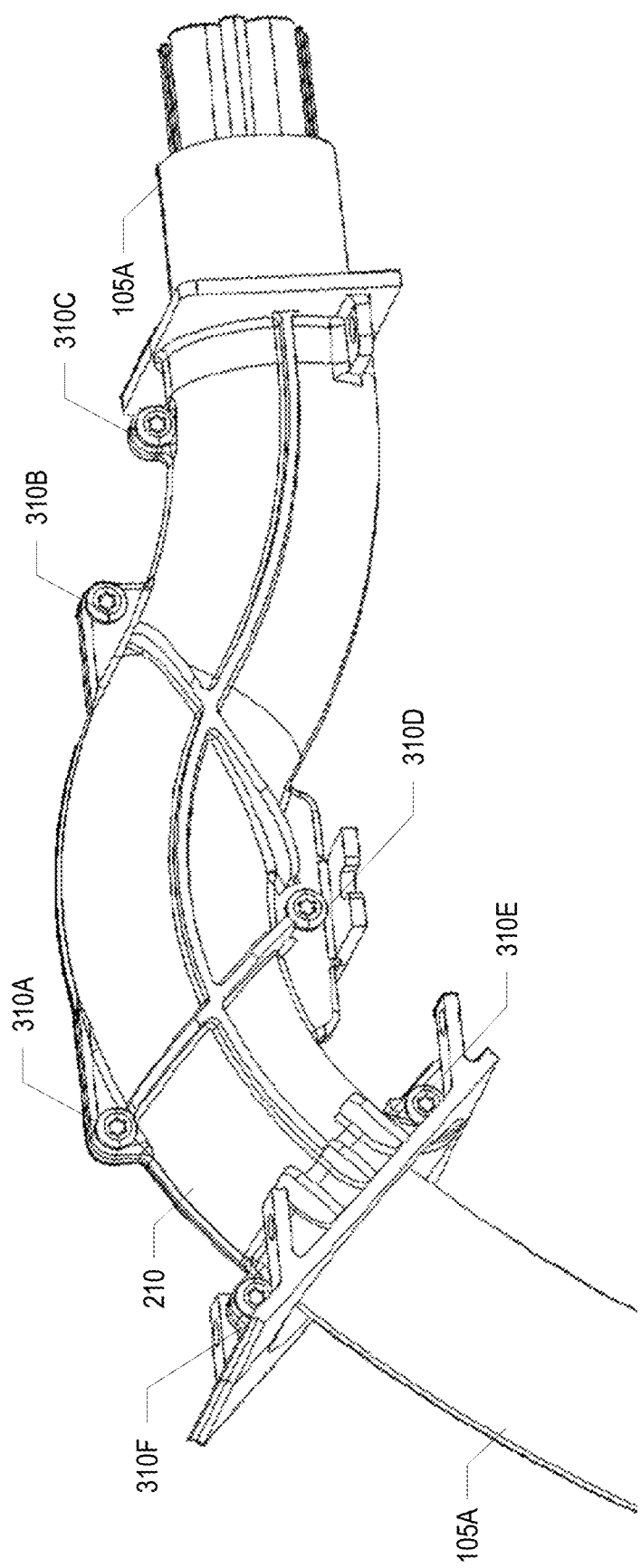
FIG. 3 illustrates the cable clamp in greater detail, according to an embodiment.
Figure 4:
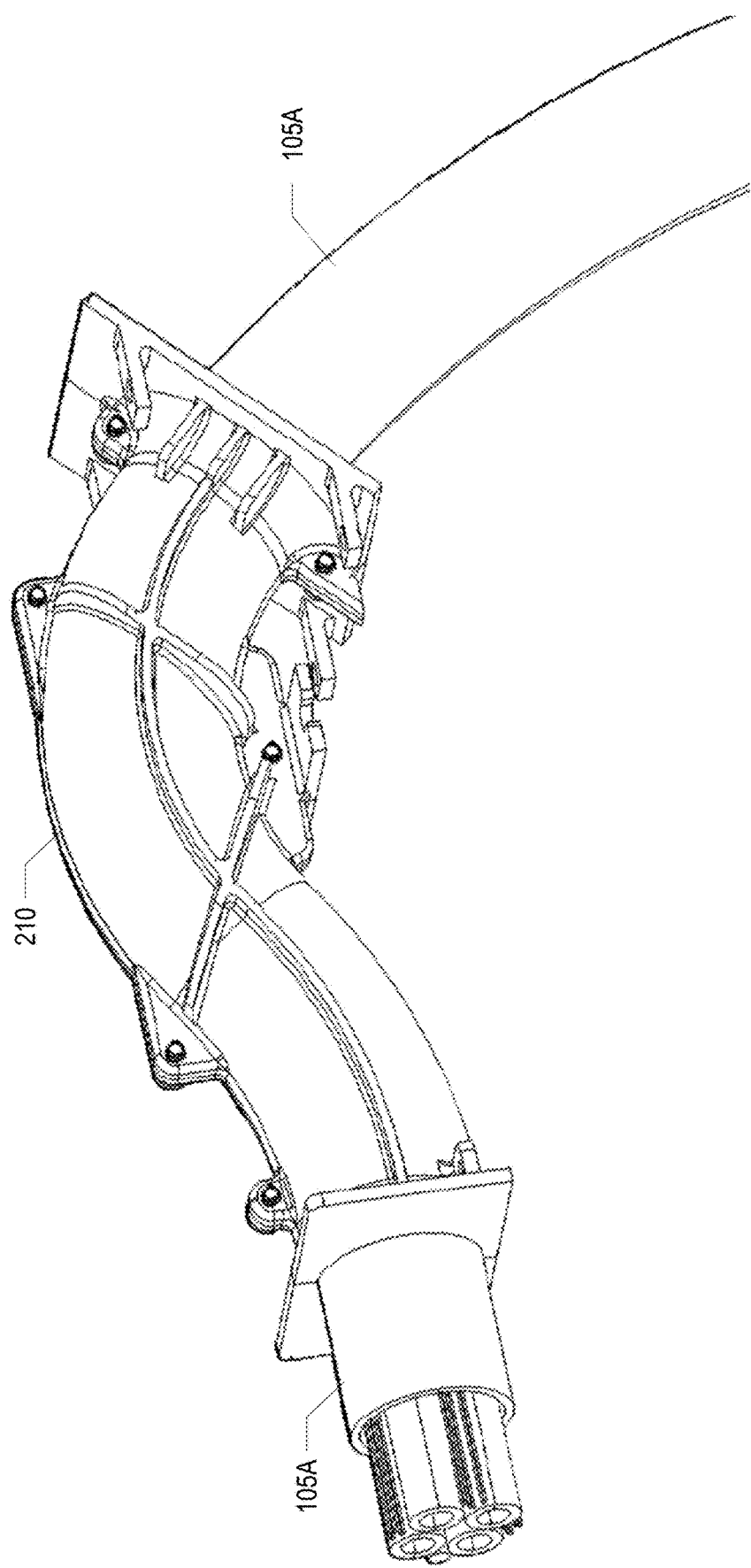
FIG. 4 shows a reverse angle of the cable clamp shown in FIG. 3, according to an embodiment.

FIG. 3 illustrates the cable clamp 210 in greater detail, according to an embodiment. As shown in FIG. 3, the charging cable 105A passes through the cable clamp 210 during use. By way of example, during installation, the installer may clamp the cable using the cable clamp 210. The cable clamp 210 secures the cable 105A to the charging station, except in cases of extreme stress that will cause the cable 105A to breakaway from the charging station. The cable clamp 210 minimizes cross section reduction (it does not impinge the cable such as pinching off liquid-coolant flow) while achieving high tensile grip (pull out forces). FIG. 4 shows a reverse angle of the cable clamp shown in FIG. 3.

Figure 5:
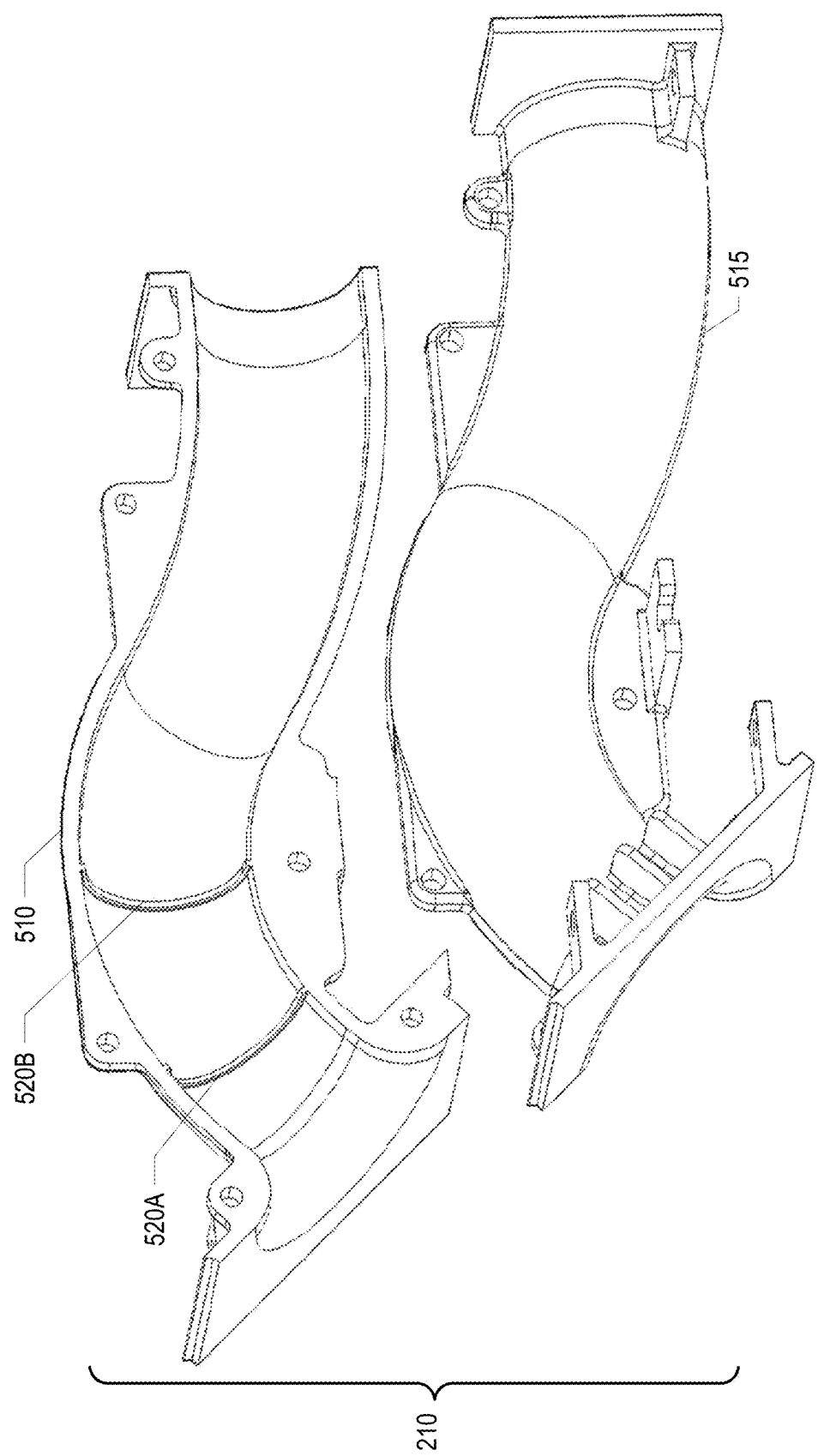
FIG. 5 shows components of the of the cable clamp, according to an embodiment.
Figure 6:
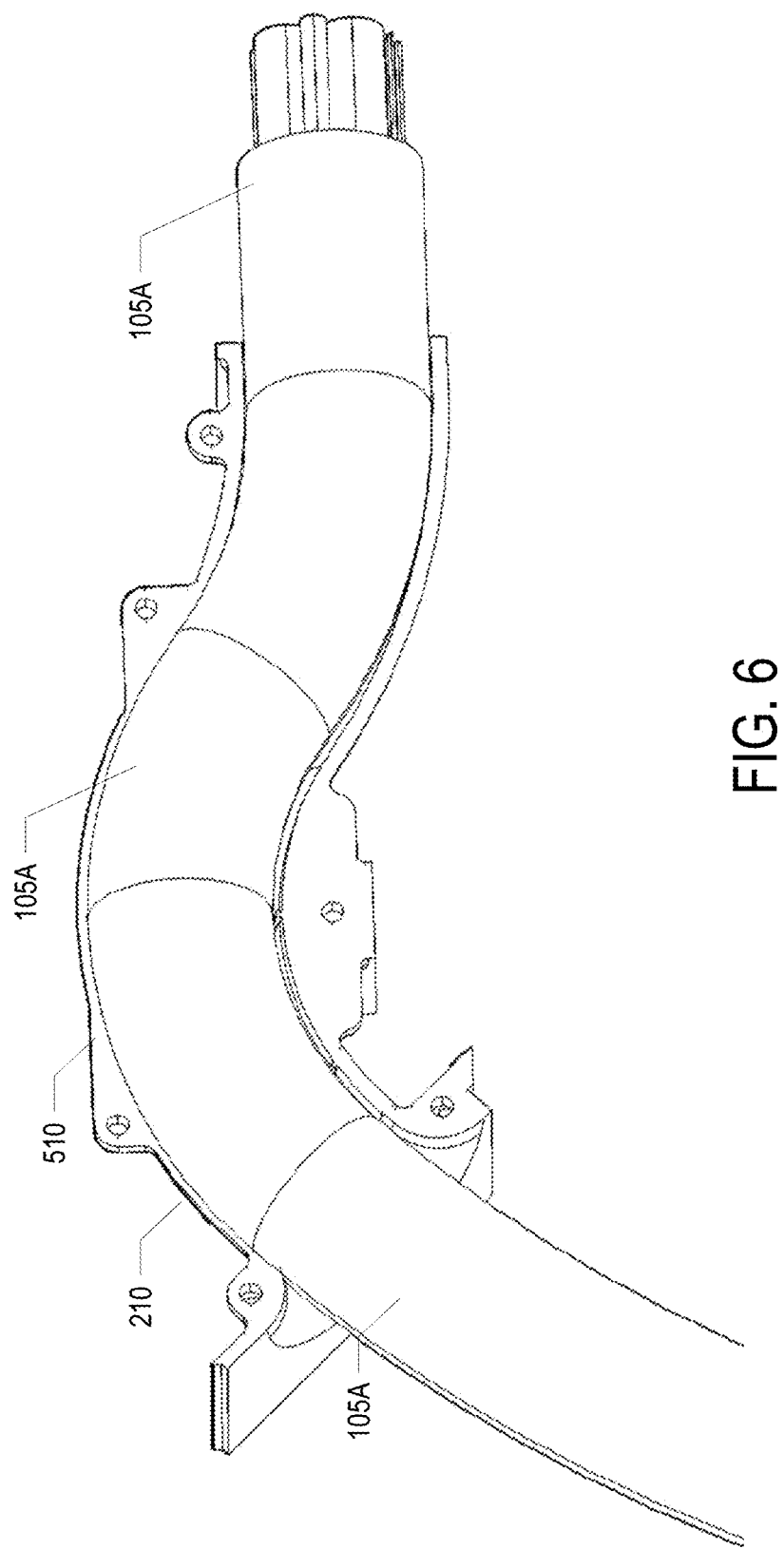
FIG. 6 shows the charging cable passing through the cable clamp without showing one of the components of the cable clamp, according to an embodiment.

The cable clamp 210 includes two complimentary clamping pieces 510 and 515 that fit together, as shown in FIG. 5. The clamping pieces 510 and 515 are adapted to be secured together and grip the charging cable 105A as it passes through the cable clamp 210. FIG. 6 shows the charging cable 105A passing through the cable clamp 210 without showing the clamping piece 515. As shown in FIG. 3, the two clamping pieces 510 and 514 are secured together with the fasteners 310A-F. The fasteners 310A-F may be any suitable fastener to secure the two clamping pieces such as screws, bolts, or pins. The number of fasteners to secure the clamping pieces may vary in different embodiments.

The clamping pieces 510 and 515 fit together to prevent or greatly reduce any impingement of the cable due to overtightening of the fasteners, which can be a common problem of other types of clamps such as gland clamps. For instance, if a fastener 310 is overtightened, the damage would typically be limited to the fastener 310 itself. However, the shape of the cable clamp 210 does not change due to overtightening of the fasteners since the clamping pieces 510 and 515 are complimentary and fit together.

The shape of the clamping pieces, and thus the cable clamp when the clamping pieces are secured, includes a curved portion that forces the charging cable 105A to exit the charging station 100 at a predetermined exit angle. For instance, the cable clamp 210 includes an inverted bend radii at the minimum bend radius of the charging cable 105A. The predetermined exit angle may be at a minimum bend radius of the charging cable 105A, and may be between 30 and 60 degrees. This reduces stress on the charging cable 105A leading to a longer lifespan of the cable and the connected components. The length of the cable clamp may be approximately six times the diameter of the charging cable. The internal diameter of the charging cable is slightly larger than the diameter of the charging cable, according to an embodiment.

In an embodiment, additional cable jacket grip can be achieved by adding internal ribs to the cable clamp to periodically imprint the surface of the cable jacket. For instance, as shown in FIG. 5, the cable clamp 210 includes the internal ribs 520A and 520B. The number, size (internal diameter), and spacing of the internal ribs can be varied to achieve the desired cable tensile grip. By way of example, the internal ribs 520A-B may protrude one to two millimeters from the inside of the cable clamp. The internal ribs may be angled so as to act as a jamming wedge so as the cable is pulled it gets forced onto the wall of the cable clamp.

As previously described, the cable clamp is secured to housing of the charging station. FIG. 7 illustrates the cable clamp 210 being secured to the charging station housing 110A. FIG. 7 shows the interior of the housing 110A of the charging station (without the front cover of the housing). The cable clamp is secured to the charging station housing 110A with a number of fasteners 705A-G. The fasteners 705A-G may be any suitable fastener to secure the cable clamp 210 to the charging station housing 110A such as screws, bolts, or pins. The number of fasteners to secure the cable clamp to the charging station housing may vary in different embodiments.

Typical gland type clamps can often be improperly tightened and impinge or reduce the cross section of the cable. In cases where the cable is liquid cooled, this impingement can cause the fluid movement to be reduced which may cause overheating or other safety related issues. The cable clamp described herein, however, minimizes cross section reduction (it does not impinge the cable such as pinching off liquid-coolant flow) while achieving high tensile grip (pull out forces).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A cable clamp for a charging cable of an electric vehicle charging station, comprising:
    a first clamping piece; and
    a second clamping piece that is complementary to the first clamping piece;
    wherein the first clamping piece and the second clamping piece are adapted to be secured together and adapted to grip the charging cable of the electric vehicle charging station that passes through the first clamping piece and the second clamping piece; and
    wherein a shape of the first clamping piece and the second clamping piece includes a curved portion that forces the charging cable of the electric vehicle charging station to exit the electric vehicle charging station at a predetermined exit angle.

2. The cable clamp of claim 1, wherein the first clamping piece and the second clamping piece includes a plurality of internal ribs.

3. The cable clamp of claim 1, wherein the predetermined exit angle is at a minimum bend radius of the charging cable.

4. The cable clamp of claim 1, wherein a length of the first clamping piece and the second clamping piece is approximately six times a diameter of the charging cable.

5. The cable clamp of claim 1, wherein the predetermined exit angle is between 30 and 60 degrees.

6. The cable clamp of claim 1, wherein the first clamping piece and the second clamping piece are to be secured together with one or more fasteners and prevent the charging cable from being impinged.

7. The cable clamp of claim 1, wherein the charging cable is a liquid cooled cable.

8. The cable clamp of claim 1, wherein the first clamping piece and the second clamping piece are designed out of a rigid plastic material.

9. The cable clamp of claim 1, wherein the first clamping piece and the second clamping piece are to be secured to a housing of the electric vehicle charging station with or more fasteners.

10. The cable clamp of claim 9, wherein the cable clamp is to be located at an exit point of the housing of the electric vehicle charging station.

11. An electric vehicle charging station, comprising:
    a housing;
    a first clamping piece; and
    a second clamping piece that is complementary to the first clamping piece;
    wherein the first clamping piece and the second clamping piece are adapted to be secured together and adapted to grip a charging cable of the electric vehicle charging station that passes through the first clamping piece and the second clamping piece; and
    wherein a shape of the first clamping piece and the second clamping piece includes a curved portion that forces the charging cable of the electric vehicle charging station to exit the electric vehicle charging station at a predetermined exit angle.

12. The electric vehicle charging station of claim 11, wherein the first clamping piece and the second clamping piece includes a plurality of internal ribs.

13. The electric vehicle charging station of claim 11, wherein the predetermined exit angle is at a minimum bend radius of the charging cable.

14. The electric vehicle charging station of claim 11, wherein a length of the first clamping piece and the second clamping piece is approximately six times a diameter of the charging cable.

15. The electric vehicle charging station of claim 11, wherein the predetermined exit angle is between 30 and 60 degrees.

16. The electric vehicle charging station of claim 11, wherein the first clamping piece and the second clamping piece are to be secured together with one or more fasteners and prevent the charging cable from being impinged.

17. The electric vehicle charging station of claim 11, wherein the charging cable is a liquid cooled cable.

18. The electric vehicle charging station of claim 11, wherein the first clamping piece and the second clamping piece are designed out of a rigid plastic material.

19. The electric vehicle charging station of claim 11, wherein the first clamping piece and the second clamping piece are to be secured to the housing of the electric vehicle charging station with or more fasteners.

20. The electric vehicle charging station of claim 19, wherein the first clamping piece and the second clamping piece are to be secured to the housing at an exit point of the housing of the electric vehicle charging station.

\* \* \* \* \*